(12) United States Patent
Hilliard

(10) Patent No.: US 12,436,576 B2
(45) Date of Patent: Oct. 7, 2025

(54) COMPUTING DEVICE

(71) Applicant: LENOVO (SINGAPORE) PTE. LTD., Singapore (SG)

(72) Inventor: Matthew Sean Hilliard, Morrisville, NC (US)

(73) Assignee: Lenovo (Singapore) Pte. Ltd.

( * ) Notice: Subject to any disclaimer, the term of this patent is extended or adjusted under 35 U.S.C. 154(b) by 382 days.

(21) Appl. No.: 17/977,125

(22) Filed: Oct. 31, 2022

(65) Prior Publication Data

US 2024/0143040 A1 May 2, 2024

(51) Int. Cl.
*G06F 1/16* (2006.01)

(52) U.S. Cl.
CPC .......... *G06F 1/1681* (2013.01); *G06F 1/1616* (2013.01)

(58) Field of Classification Search
CPC .... G06F 1/1681; G06F 1/1616; G06F 1/1618; G06F 1/1675; G06F 1/1662; G06F 1/1679; G06F 1/1652; G06F 1/1641; G06F 1/16; G06F 2200/1637; G09G 5/10; G09G 5/38; G09G 2340/0492; G09G 2354/00; G09G 5/003; G09G 2380/02; F16M 11/105; F16M 13/005; F16M 2200/021; F16C 2202/42; F16C 2350/54; E05D 3/122; E05D 11/1028; E05D 11/082; E05D 3/06; E05D 11/00; E05D 3/12; E05D 2011/1035; E05D 2007/128; E05D 11/1014; E05D 3/14; E05D 3/186; E05Y 2201/00; E05Y 2600/50; E05Y 2999/00; E05Y 2900/606

See application file for complete search history.

(56) References Cited

U.S. PATENT DOCUMENTS

| | | | | |
|---|---|---|---|---|
| 1,984,092 A | * | 12/1934 | Soss | E05D 3/16 16/369 |
| 2,021,702 A | * | 11/1935 | Soss | E05D 3/16 16/369 |
| 2,157,027 A | * | 5/1939 | Soss | E05D 3/16 16/250 |
| 4,599,998 A | * | 7/1986 | Castillo | A61F 5/0123 74/109 |
| 5,970,890 A | * | 10/1999 | Harry | G07F 19/205 109/59 R |
| 6,151,757 A | * | 11/2000 | Beals, Jr. | E05D 7/009 16/388 |

(Continued)

FOREIGN PATENT DOCUMENTS

EP 3276113 A1 * 1/2018 ............. E05D 3/186

*Primary Examiner* — Sagar Shrestha
(74) *Attorney, Agent, or Firm* — Brian J. Pangrle

(57) ABSTRACT

A computing device can include a processor; memory accessible by the processor; a first housing that includes a first pair of axles; a second housing that includes a second pair of axles and a display operatively coupled to the processor; and a hinge assembly that couples the first housing and the second housing, where the hinge assembly includes a first bar supported by one of the first pair of axles and one of the second pair of axles, a second bar supported by another one of the first pair of axles and another one of the second pair of axles, and an alignment mechanism for the first bar and the second bar, where the first bar and the second bar overlap at an angle of 180 degrees of the first housing and the second housing and cross at angles other than 180 degrees of the first housing and the second housing.

12 Claims, 13 Drawing Sheets

(56) References Cited

U.S. PATENT DOCUMENTS

| | | | | |
|---|---|---|---|---|
| 6,223,393 B1* | 5/2001 | Knopf | G06F 1/1681 | |
| | | | 16/386 | |
| 6,317,927 B1* | 11/2001 | Lai | G06F 1/1681 | |
| | | | 16/338 | |
| 6,798,649 B1* | 9/2004 | Olodort | G06F 1/1618 | |
| | | | 345/905 | |
| 7,350,273 B1* | 4/2008 | Skipper | E05D 3/16 | |
| | | | 16/369 | |
| 8,032,988 B2* | 10/2011 | Lai | G06F 1/1681 | |
| | | | 16/354 | |
| 8,312,596 B2* | 11/2012 | Self | A47K 3/36 | |
| | | | 16/354 | |
| 8,484,803 B2* | 7/2013 | Ma | E05D 3/122 | |
| | | | 16/371 | |
| 8,562,236 B2* | 10/2013 | Eikelenboom | E05F 15/51 | |
| | | | 16/221 | |
| 8,720,011 B1* | 5/2014 | Hsu | G06F 1/1681 | |
| | | | 16/354 | |
| 8,851,798 B1* | 10/2014 | Jaycox | B63B 35/38 | |
| | | | 114/353 | |
| 8,869,352 B2* | 10/2014 | Hsu | G06F 1/1681 | |
| | | | 16/354 | |
| 8,869,353 B2* | 10/2014 | Hsu | E05D 3/14 | |
| | | | 16/366 | |
| 8,948,960 B2* | 2/2015 | Griffith | G06F 11/182 | |
| | | | 244/99.2 | |
| 8,982,542 B2* | 3/2015 | Bohn | G06F 1/1681 | |
| | | | 361/679.28 | |
| 9,173,287 B1* | 10/2015 | Kim | G06F 1/1652 | |
| 9,176,535 B2* | 11/2015 | Bohn | G06F 1/1681 | |
| 9,201,464 B2* | 12/2015 | Uchiyama | G06F 1/1618 | |
| 9,235,239 B2* | 1/2016 | van Dijk | H04M 1/0268 | |
| 9,528,308 B2* | 12/2016 | Cho | E05D 3/122 | |
| 9,580,948 B2* | 2/2017 | Nakamura | G09F 9/3026 | |
| 9,927,845 B1* | 3/2018 | Holung | E05D 11/0054 | |
| 10,082,839 B1* | 9/2018 | Turchin | G09F 9/301 | |
| 10,146,267 B2* | 12/2018 | Perelli | G06F 1/1662 | |
| 10,152,094 B1* | 12/2018 | Holung | E05D 3/122 | |
| 10,296,054 B2* | 5/2019 | Holung | H04M 1/022 | |
| 10,365,694 B2* | 7/2019 | Lin | G06F 1/1679 | |
| 10,401,917 B1* | 9/2019 | Dai | G06F 1/1679 | |
| 10,545,534 B2* | 1/2020 | Ent | G06F 1/1681 | |
| 10,725,505 B1* | 7/2020 | Hallar | G06F 1/1662 | |
| 10,845,850 B1* | 11/2020 | Kang | H04M 1/0268 | |
| 10,928,864 B1* | 2/2021 | Sanchez | E05D 11/1028 | |
| 11,016,540 B2* | 5/2021 | Hallar | E05D 11/1028 | |
| 11,294,431 B2* | 4/2022 | Torres | E05D 3/06 | |
| 11,662,779 B2* | 5/2023 | Morrison | G06F 1/1616 | |
| | | | 361/679.31 | |
| 11,662,781 B2* | 5/2023 | Kang | G06F 1/1652 | |
| | | | 361/679.01 | |
| 11,789,492 B2* | 10/2023 | Perelli | G09G 5/38 | |
| | | | 345/659 | |
| 11,886,257 B2* | 1/2024 | Kim | H04M 1/022 | |
| 11,889,007 B2* | 1/2024 | Kim | G06F 1/1681 | |
| 11,983,046 B2* | 5/2024 | Sanchez | G06F 1/1618 | |
| 2005/0122671 A1* | 6/2005 | Homer | G06F 1/1681 | |
| | | | 361/679.57 | |
| 2008/0109995 A1* | 5/2008 | Kuwajima | H04M 1/022 | |
| | | | 16/354 | |
| 2008/0284295 A1* | 11/2008 | Lai | G06F 1/1681 | |
| | | | 16/354 | |
| 2009/0000062 A1* | 1/2009 | Yamanami | G06F 1/1616 | |
| | | | 16/366 | |
| 2010/0064648 A1* | 3/2010 | Koshihara | A01D 34/90 | |
| | | | 403/113 | |
| 2011/0000136 A1* | 1/2011 | Brun | E05D 11/0081 | |
| | | | 49/358 | |
| 2011/0097138 A1* | 4/2011 | Eikelenboom | E05D 15/26 | |
| | | | 403/81 | |
| 2011/0271486 A1* | 11/2011 | Wang | G06F 1/1681 | |
| | | | 16/354 | |
| 2012/0120618 A1* | 5/2012 | Bohn | H04M 1/022 | |
| | | | 361/679.01 | |
| 2013/0021762 A1* | 1/2013 | van Dijk | G09F 9/301 | |
| | | | 361/749 | |
| 2016/0132075 A1* | 5/2016 | Tazbaz | G06F 1/1616 | |
| | | | 361/679.27 | |
| 2021/0034117 A1* | 2/2021 | Torres | G06F 1/1652 | |
| 2021/0096608 A1* | 4/2021 | Hallar | E05D 11/1028 | |
| 2022/0147114 A1* | 5/2022 | Torres | G06F 1/1681 | |
| 2023/0353665 A1* | 11/2023 | Han | G06F 1/1652 | |
| 2023/0366248 A1* | 11/2023 | Chung | E05D 3/122 | |

* cited by examiner

COMPUTING DEVICE

TECHNICAL FIELD

Subject matter disclosed herein generally relates to computing and display devices.

BACKGROUND

A device can include housings coupled via one or more hinge assemblies where one or more of the housings can include a display.

SUMMARY

A computing device can include a processor; memory accessible by the processor; a first housing that includes a first pair of axles; a second housing that includes a second pair of axles and a display operatively coupled to the processor; and a hinge assembly that couples the first housing and the second housing, where the hinge assembly includes a first bar supported by one of the first pair of axles and one of the second pair of axles, a second bar supported by another one of the first pair of axles and another one of the second pair of axles, and an alignment mechanism for the first bar and the second bar, where the first bar and the second bar overlap at an angle of 180 degrees of the first housing and the second housing and cross at angles other than 180 degrees of the first housing and the second housing. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
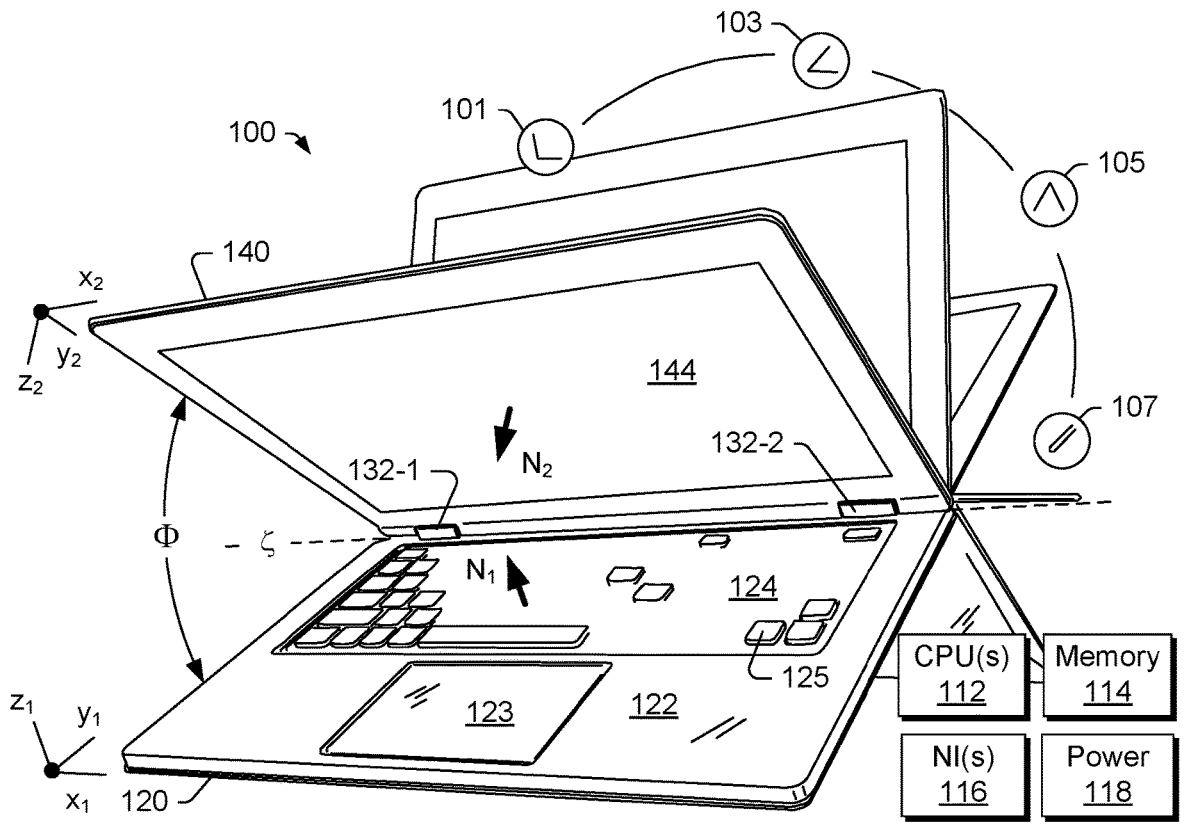
FIG. 1 is a series of diagrams of examples of devices.
Figure 1:
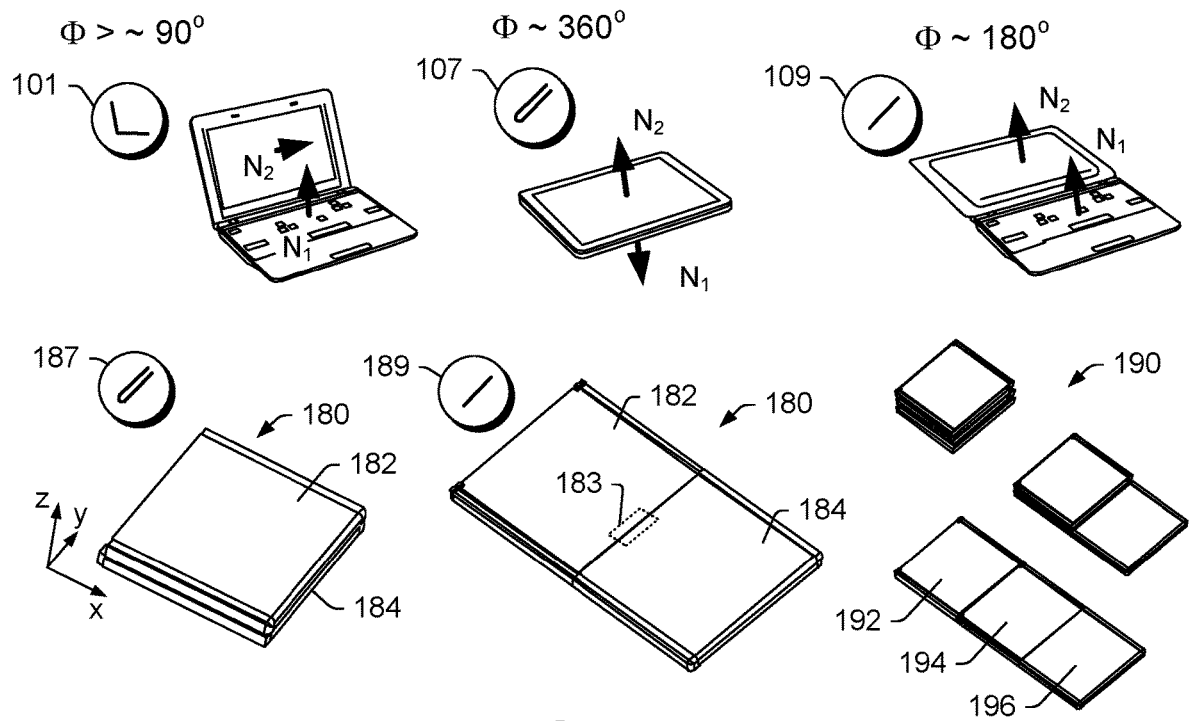

FIG. 1 shows an example of a system 100 that includes a keyboard housing 120 and a display housing 140 that are pivotable with respect to each other via movement about one or more hinges 132-1 and 132-2 (e.g., hinge assemblies). FIG. 1 also shows an example of a system 180 that includes a first housing 182 and a second housing 184 that are pivotable with respect to each other via movement about one or more hinges 183 and an example of a system 190 that includes a first housing 192, a second housing 194 and a third housing 196 that may be pivotable with respect to each other via movement about hinges.

As an example, the system 100, the system 180 and/or the system 190 may include one or more processors 112, memory 114 (e.g., one or more memory devices), one or more network interfaces 116, and one or more power cells 118. Such components may be, for example, housed with the keyboard housing 120, the display housing 140, the keyboard housing 120 and the display housing 140, the housing 182, the housing 184, the housing 182 and the housing 184, one or more of the housings 192, 194 and 196, etc.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along an x-axis ($x_1$), a length along a y-axis ($y_1$) and a height along a z-axis ($z_1$) that extends in a direction outwardly away from touch surfaces of keys 125 of the keyboard 124 and the display 144 is defined in a second Cartesian coordinate system as having a width along an x-axis ($x_2$), a length along a y-axis ($y_2$) and a height along a z-axis ($z_2$) that extends in a direction outwardly away from a viewing surface of the display 144.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle $\Phi$ is about 0 degrees), the vectors $N_1$ and $N_2$ would be pointing toward each other.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

As shown in FIG. 1, the system 180 can include a folded orientation 187 and a planar orientation 189. As an example, one or both of the housings 182 and 184 may include a display. For example, the housing 182 can be a first housing with a first display and the housing 184 can be a second housing with a second display.

As shown in FIG. 1, the system 190 can include various orientations, including, for example, a planar orientation of the three housings, a partially folded orientation and a folded orientation. As an example, a three housing system may be configurable in more than one folded orientation with respect to a "middle" housing. For example, the housings 192 and 196 may be folded with respect to the housing 194 with the housing 192 on the top side or bottom side or with the housing 196 on the top side or bottom side.

As explained with respect to FIG. 1, a computing device can include two or more displays. For example, a dual-screen computer can include a first touch-sensitive display and a second touch-sensitive display where each of the displays may be mounted to a respective housing where the housings are operatively coupled via one or more hinge assemblies.

Figure 2:
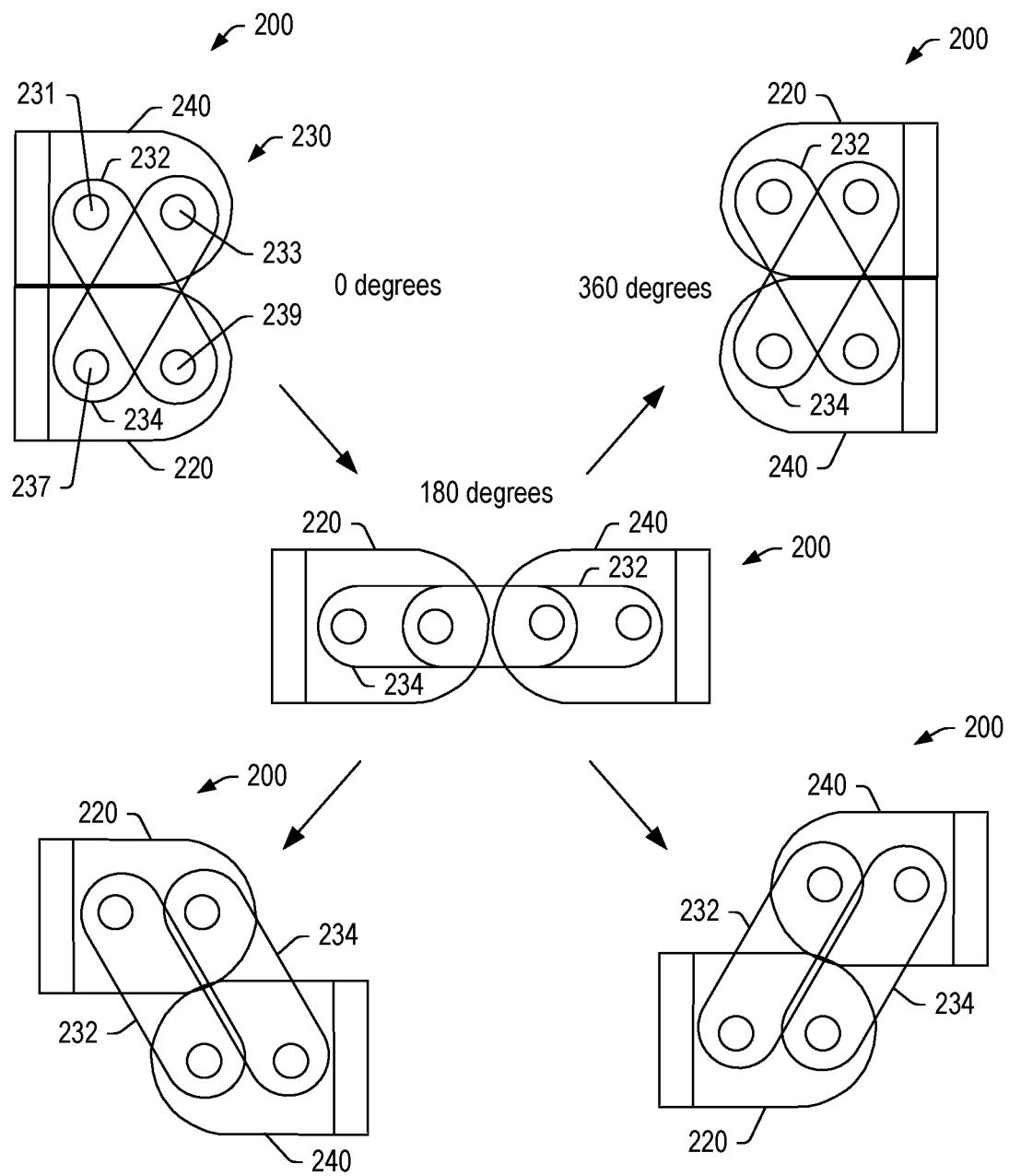
FIG. 2 is a series of views of an example of a portion of a computing device with a hinge assembly.

FIG. 2 shows a series of views of a hinge assembly 230 of a computing device 200 that includes a first housing 220 and a second housing 240, which may be, for example, display housings, a keyboard housing and a display housing, etc., that are physically coupled via the hinge assembly 230.

In FIG. 2, the hinge assembly 230 includes axles 231, 233, 237 and 239 where the axles 231 and 239 support a first bar 232 and where the axles 233 and 237 support as second bar 234 where the first bar 232 and the second bar 234 may be referred to as links. As shown in FIG. 2, the hinge assembly 230 can allow for various orientations of the housings 220 and 240, including a 0 degree orientation, a 180 degree orientation and a 360 degree orientation. However, the bars 232 and 234 can be amenable to some amount of undesirable behavior, which may be referred to as link instability. For example, in the lower left and lower right of FIG. 2, two undesirable positions of the bars 232 and 234 are shown along with associated orientations of the housings 220 and 240. Such orientations, or positions, of the housings 220 and 240 may be detrimental in that various surfaces may contact and wear in an undesirable manner. Further, such positions do not correspond to a desirable position such as 0 degrees, 180 degrees or 360 degrees or, for example, another desirable position that may correspond to one of the orientations shown in FIG. 1.

Figure 3:
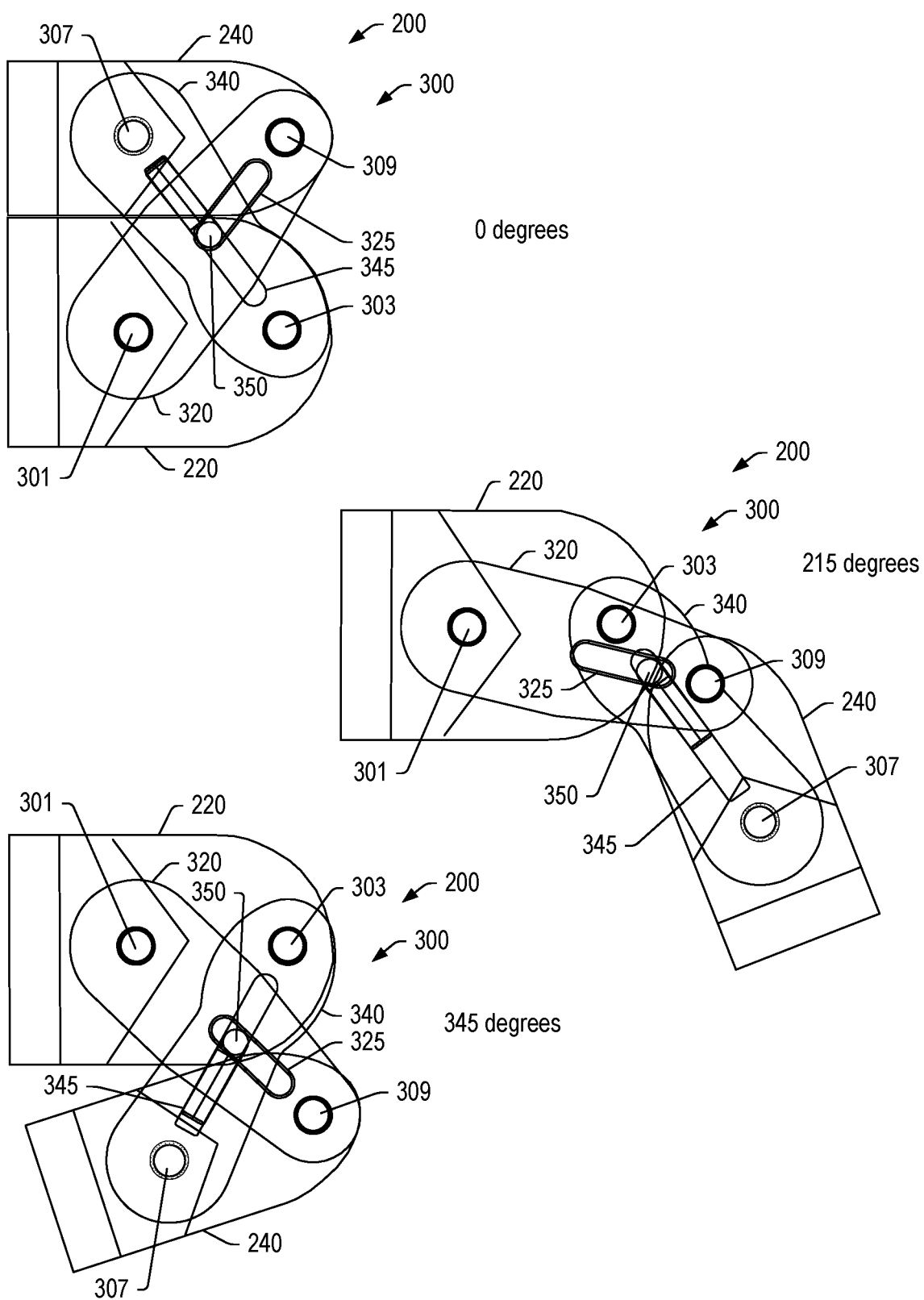
FIG. 3 is a series of views of an example of a portion of a computing device and an example of a hinge assembly.

FIG. 3 shows an example of a hinge assembly 300 for a computing device 200 that includes a first housing 220 and a second housing 240. The hinge assembly 300 can prevent the housings 220 and 240 from moving into an undesirable position such as the undesirable positions shown in FIG. 2. In particular, the hinge assembly 300 includes an alignment mechanism that assures proper alignment of a first bar 320 and a second bar 340 for movement of the housings 220 and 240 over a range of angles that includes 180 degrees. In FIG. 2, the undesirable positions can be a consequence of instability of the bars 232 and 234 at angles of the housings 220 and 240 at and/or proximate to 180 degrees. In FIG. 3, the alignment mechanism provides for support of the bars 320 and 340 at and/or proximate to 180 degrees.

In the example of FIG. 3, the hinge assembly 300 includes axles 301, 303, 307 and 309, the bars 320 and 340 and a pin 350. As shown, the bar 320 includes a slot 325 and the bar 340 includes a slot 345 where a portion of the pin 350 is received in the slot 325 and where another portion of the pin 350 is received in the slot 345. As indicated by various example orientations for angles of 0 degrees, 215 degrees and 345 degrees, the pin 350 can move in the slots 325 and 345 such that the bars 320 and 340 maintain proper alignment, which may be referred to as overlapping or crossed alignment.

Referring again to FIG. 2, the undesirable positions show the bars 232 and 234 as being part of a four-bar linkage shaped as a parallelogram. As explained, the positions associated with the parallelogram shape are undesirable for one or more reasons. In the example of FIG. 3, a parallelogram shape is not achievable due to the alignment mechanism, which maintains overlap and crossing of the bars 320 and 340 via the slidable pin 350 in the slots 325 and 345. In the example of FIG. 3, the slidable pin 350 is shown as a bent pin; noting that one or more other pin shapes (e.g., one or more other coupling elements) may be utilized. In the example of FIG. 3, the pin 350 can help to minimize thickness of the hinge assembly 300 as the pin 350 may be seated within the slots 325 and 345 without extending outwardly from opposing sides of the slots 325 and 345.

As an example, the axles 301 and 303 can be a first pair of axles that can be part of a first housing where the first housing includes a portion of the hinge assembly 300 and the axles 307 and 309 can be a second pair of axles of a second housing where the second housing includes a portion of the hinge assembly 300. In such an example, the hinge assembly 300 includes the bar 320 as a first bar supported by one of the first pair of axles (see, e.g., the axle 301) and one of the second pair of axles (see, e.g., the axle 309), the bar 340 as a second bar supported by another one of the first pair of axles (see, e.g., the axle 303) and another one of the second pair of axles (see, e.g., the axle 307), and an alignment mechanism for the first bar 320 and the second bar 340, where the first bar 320 and the second bar 340 can overlap at an angle of 180 degrees of the first housing and the second housing and cross at angles other than 180 degrees of the first housing and the second housing.

Figure 4:
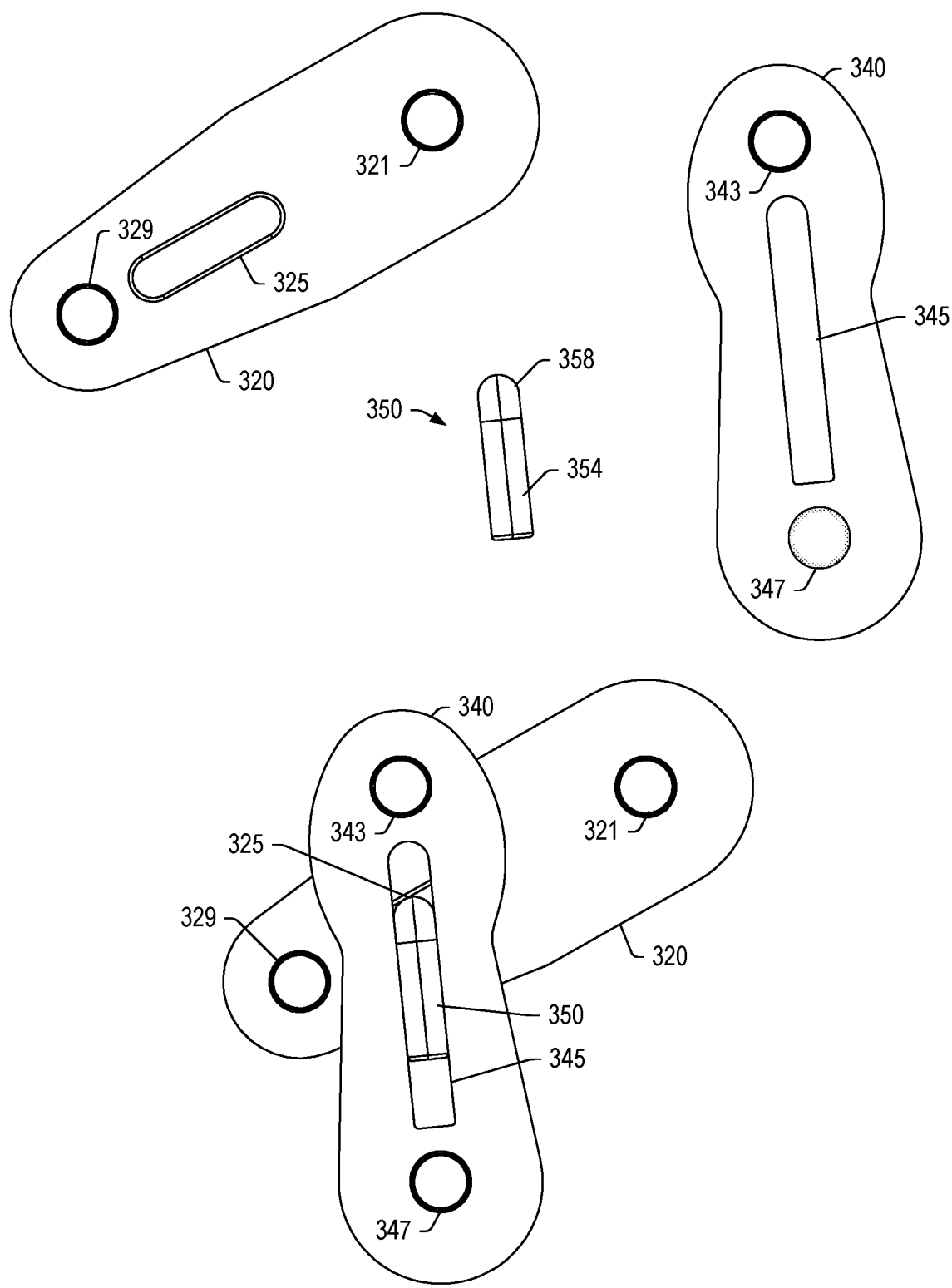
FIG. 4 is a series of plan views of examples of components of an example of a hinge assembly.

FIG. 4 shows plane views of portions of the hinge assembly 300 of FIG. 3. As shown, the bar 320 includes openings 321 and 329 for receipt of the axles 301 and 309 and the bar 340 includes openings 343 and 347 for receipt of the axles 303 and 307. In the example of FIG. 4, the pin 350 is shown as including a head portion 358 and a body portion 354 where the shape of the pin 350 may be a bent pin whereby a body is bent by approximately 90 degrees to form the head portion 358 and the body portion 354. In the example of FIG. 4, the body portion 354 is received by the slot 345 of the bar 340 and the head portion 358 is received by the slot 325 of the bar 320. In the example of FIG. 4, the slot 325 is disposed between the openings 321 and 329 of the bar 320 and the slot 345 is disposed between the openings 343 and 347 of the bar 340. In operation, the head portion 358 of the pin 350 is maintained at a point along an intersection of a first line between the openings 321 and 329 of the bar 320 and a second line between the openings 343 and 347 of the bar 340 such that the bars 320 and 340 always overlap, for example, the first and second lines cross at angles other than 180 degrees and overlap at 180 degrees.

Figure 5:
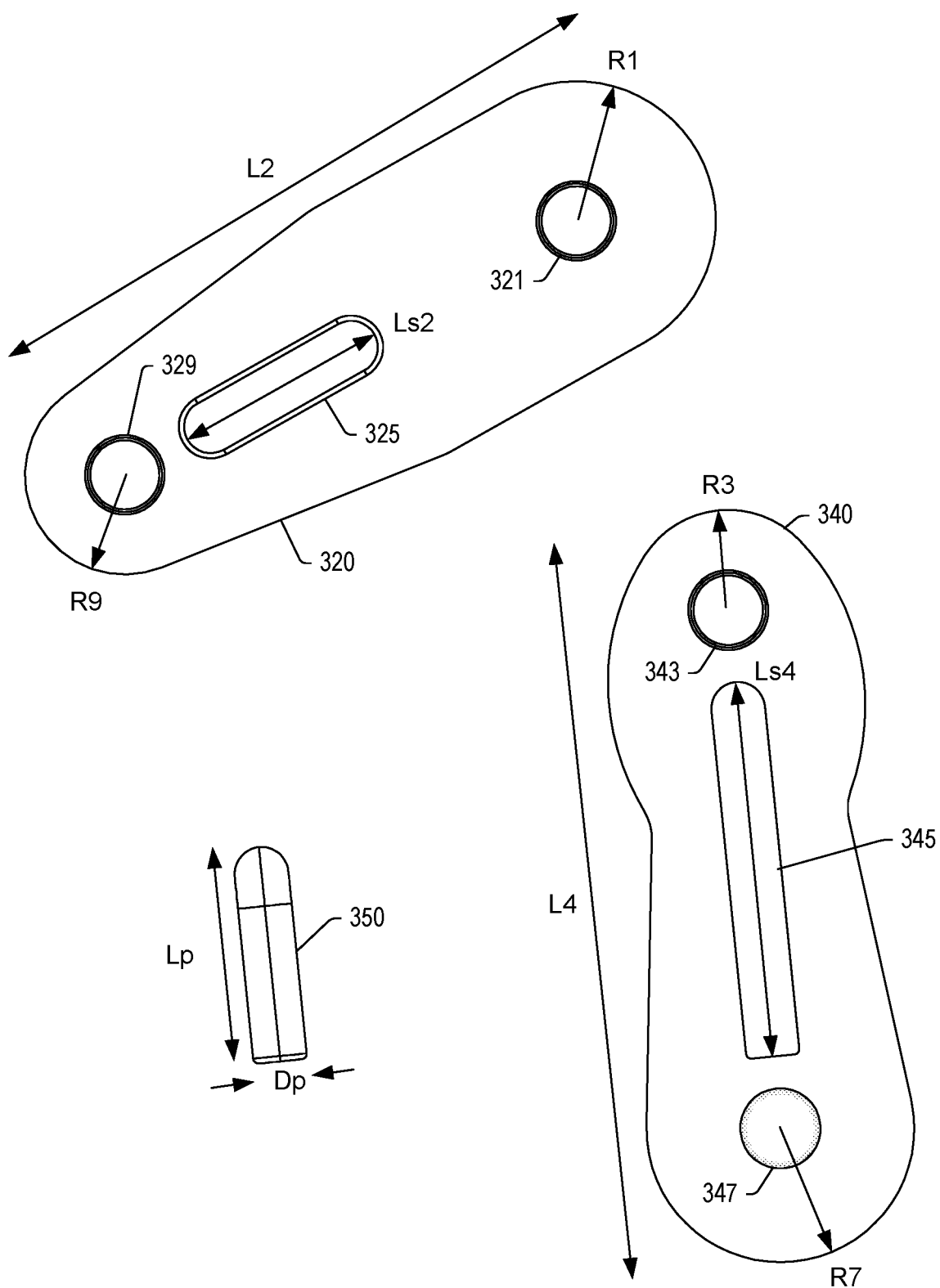
FIG. 5 is a series of plan views of examples of components of an example of a hinge assembly.

FIG. 5 shows plan views of the bars 320 and 340 and the pin 350 along with various dimensions. For example, the bar 320 can have a longitudinal length L2 from end to end where a first end is defined by a radius R9 as measured from an axis of the opening 329 and where a second end is defined by a radius R1 as measured from an axis of the opening 321 where R1 may be greater than or equal to R9, which may depend on one or more housing thicknesses and, for example, the bar 340 can have a longitudinal length L4 from end to end where a first end is defined by a radius R7 as measured from an axis of the opening 347 and where a second end is defined by a radius R3 as measured from an axis of the opening 343 where R7 may be greater than or equal to R3, which may depend on one or more housing thicknesses. As shown in the example of FIG. 3, the inner ends of the bars 320 and 340 can be larger than their outer ends. An inner end may be referred to as an end at an inner axle such as the axle 301 for the bar 320 and the axle 307 for the bar 340 while an outer end may be referred to as an end at an outer axle such as the axle 309 for the bar 320 and the axle 303 for the bar 340.

In the example of FIG. 5, a longitudinal length Ls2 is shown for the slot 325 and a longitudinal length Ls4 is shown for the slot 345, where the slot 345 may have a flat end and a rounded end while the slot 325 may have two rounded ends. As shown, the pin 350 can be defined by a pin length Lp and a pin diameter Dp. As to widths of the slots 325 and 345, they may be approximately the same as the pin diameter Dp. As an example, a slight interference fit may be provided between the pin 350 and one or more of the slots 325 and 345, which may provide some amount of friction, for example, to help stabilize a computing device with the hinge assembly 300 at a desired angle of two housings.

Figure 6:
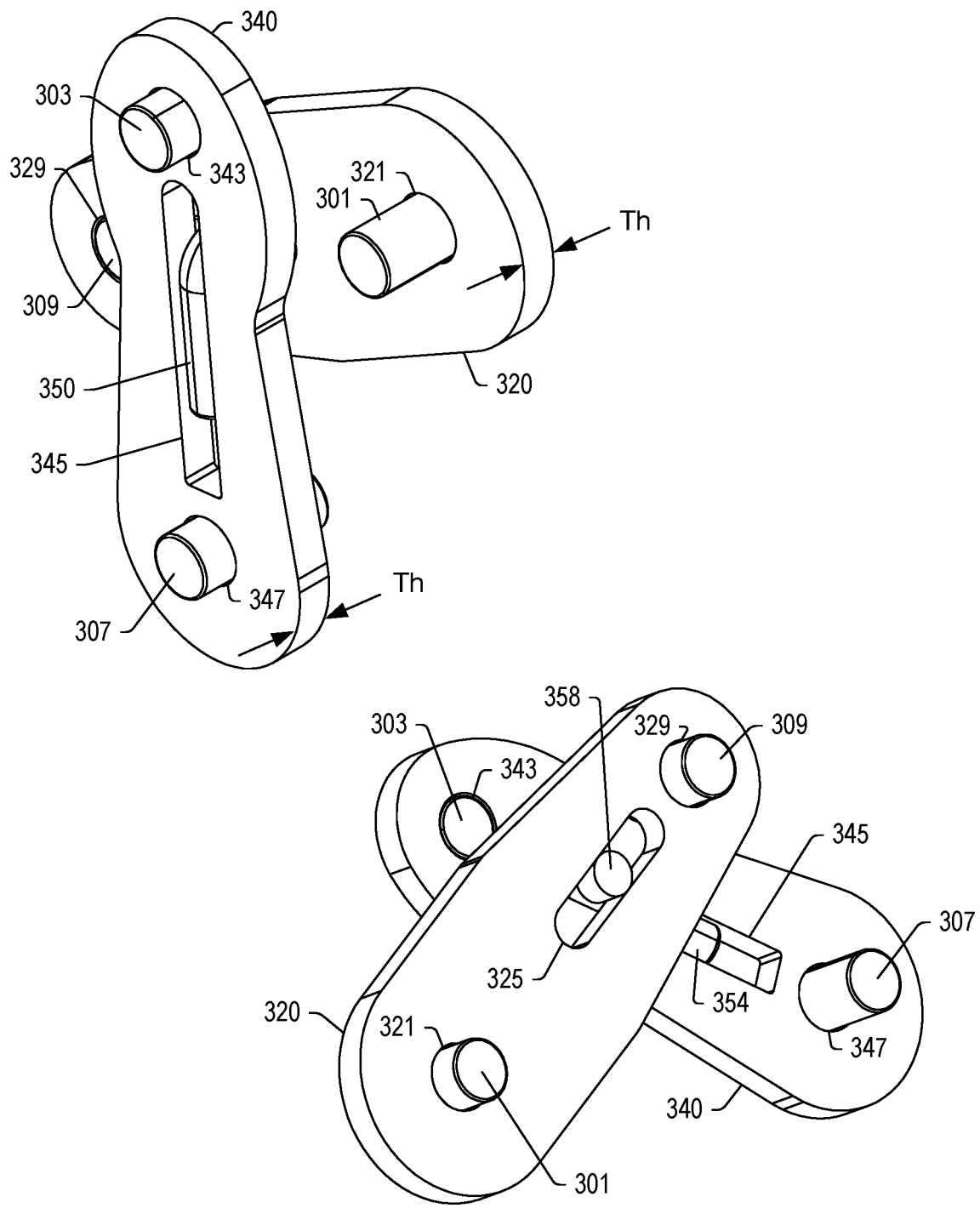
FIG. 6 is a series of perspective views of examples of a portion of a hinge assembly.

FIG. 6 shows two perspective views of a portion of the hinge assembly 300 where axles 301, 303, 307 and 309 are shown as being received in the openings 321, 343, 347 and 329, respectively. Further, the head portion 358 of the pin 350 is shown as being received in the slot 325 while the body portion 354 of the pin 350 is shown as being received in the slot 345. As explained, the pin 350 and the slots 325 and 345 are part of an alignment mechanism that maintains alignment of the bars 320 and 340 of the hinge assembly 300 such that undesirable positions do not occur.

In the example of FIG. 6, each of the bars 320 and 340 is shown as having a corresponding thickness Th. As an example, the bars 320 and 340 may be of the same thickness or they may differ in thickness. As shown, the pin 350 can be configured with appropriate dimensions for providing an alignment function. As an example, the head portion 358 may be of a length that is approximately equal to a thickness of the bar 320 and the body portion 354 may be of a diameter that is approximately equal to a thickness of the bar 340. As shown, the length of the pin 350 is less than a length of the slot 345 and, in the example of FIG. 6, the slot 345 has a length that is greater than a length of the slot 325. As an example, the length of the slot 325 may be sufficient to accommodate a range of angles of two housings (e.g., from 0 degrees to 180 degrees or to 360 degrees).

Figure 7:
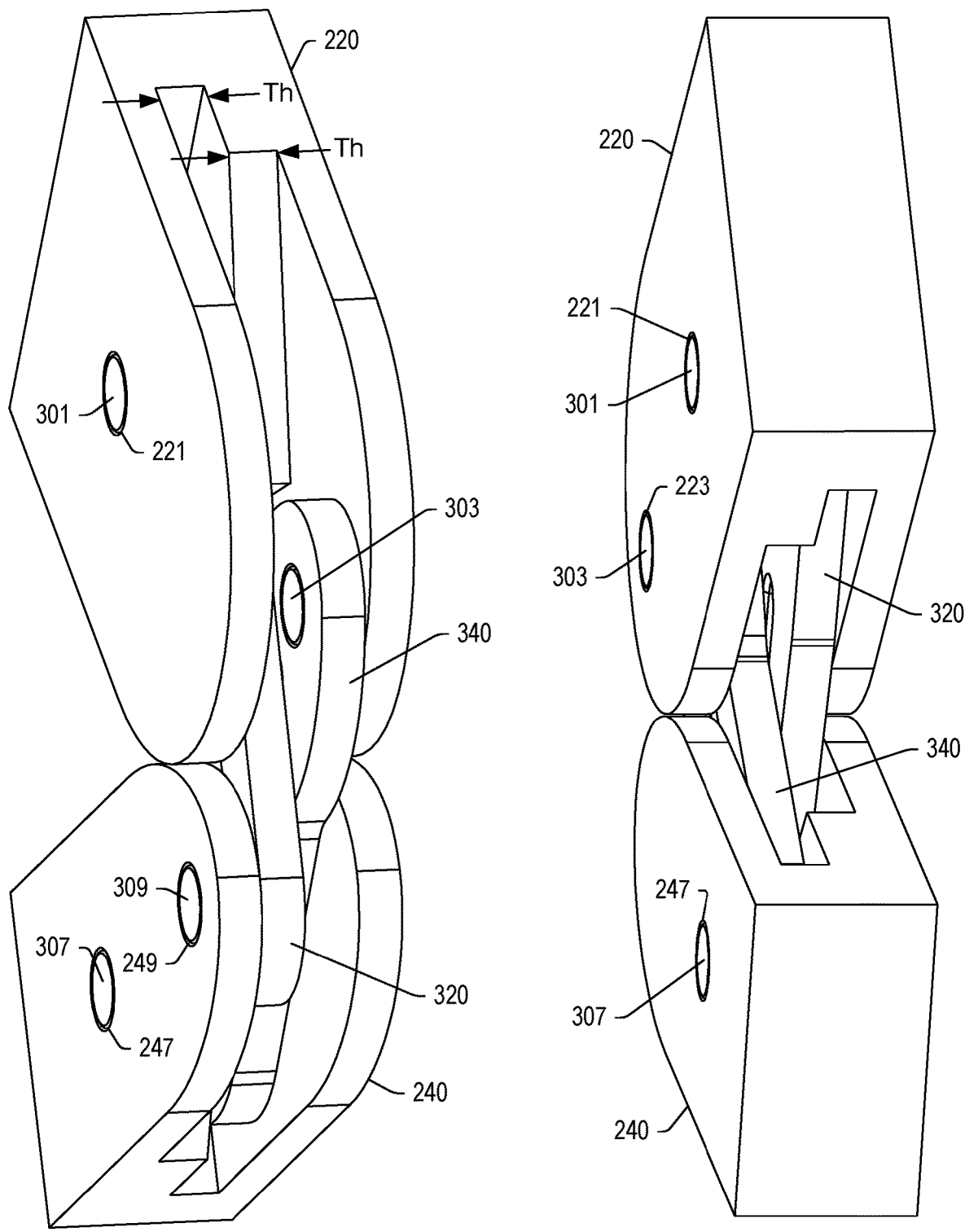
FIG. 7 is a series of perspective views of examples of a hinge assembly.

FIG. 7 shows perspective views of the example hinge assembly 300 and the example housings 220 and 240. As shown, the housings 220 and 240 can include recesses that are of appropriate widths, Th, which may be approximately equal to respective widths of the bars 320 and 340. In the example of FIG. 7, the housing 220 includes openings 221 and 223 to support the axles 301 and 303, respectively, while the housing 240 includes openings 247 and 249 to support the axles 307 and 309, respectively. As shown, the axles 301 and 307 are through axles while the openings 221 and 247 are through bore openings and the axles 303 and 309 are not through axles and the openings 223 and 247 do not need to be through bore openings (e.g., may be through bore openings or single sided openings). In the example of FIG. 7, the axles 303 and 309 may be of a lesser length or lesser lengths than their corresponding axles 301 and 307. As explained, the bars 320 and 340 can include portions that cross at angles other than 180 degrees while the bars 320 and 340 can include portions that overlap at 180 degrees.

Figure 8:
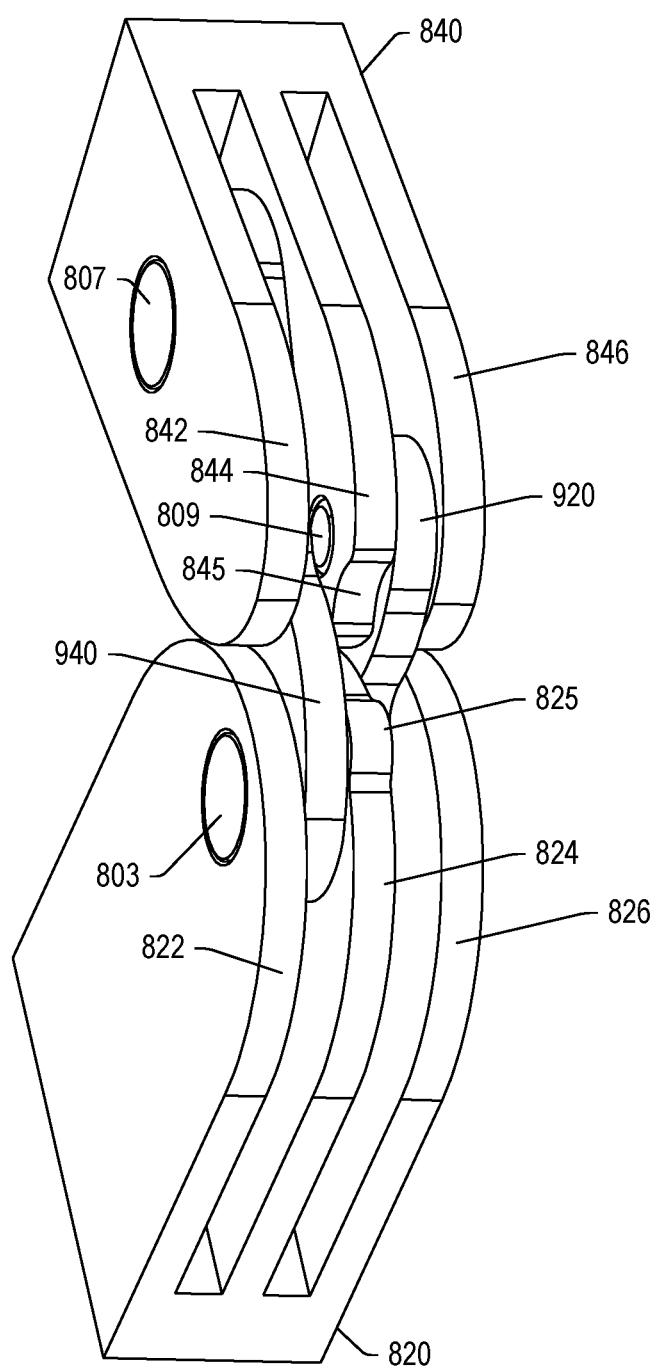
FIG. 8 is a perspective view of an example of a hinge assembly.

FIG. 8 shows a perspective view of an example of a hinge assembly 800 that includes a first housing 820, a second housing 840, a first bar 920 and a second bar 940, along with an alignment mechanism defined by an alignment feature 825 of the first housing 820 and an alignment feature 845 of the second housing 840. In the example of FIG. 8, the alignment features 825 and 845 cooperate at 180 degrees, and at angles proximate thereto, to assure that the bars 920 and 940 do not allow for undesirable positions of the housings 820 and 840.

In the example of FIG. 8, the housing 820 includes a series of plates 822, 824 and 826 and the housing 840 includes a series of plates 842, 844 and 846. As shown, the plate 824 can include a prong as the alignment feature 825 and the plate 844 can include a socket as the alignment feature 845 where at 180 degrees, the prong alignment feature 825 is received by the socket alignment feature 845. As an example, the prong may be referred to as a tooth. As an example, a prong or tooth may be radiused, for example, defined by a portion of a circle, an ellipse, an oval, etc., and a socket may be radiused, for example, defined by a portion of a circle, an ellipse, an oval, etc. While the example of FIG. 8 is shown with one pair of alignment features on center plates such as the plates 824 and 844, a hinge assembly may include multiple pairs and/or one or more pairs of alignment features on one or more plates. For example, consider the plates 822 and 842 as including alignment features and/or the plates 826 and 846 as including alignment features where, for example, the plates 824 and 844 may be optional and, if present, may or may not include alignment features.

In the example of FIG. 8, the bar 940 is disposed in part between the plates 842 and 844 and in part between the plates 822 and 824 and the bar 920 is disposed in part between the plates 844 and 846 and in part between the plates 824 and 826.

In the example of FIG. 8, an axle 803 is shown as being, for example, part of the housing 820 and an axle 807 is shown as being, for example, part of the housing 840. Further, in the view of FIG. 8, another axle 809 can be, for example, part of the housing 840; noting that the housing 820 can also include another axle (see, e.g., FIG. 9).

Figure 9:
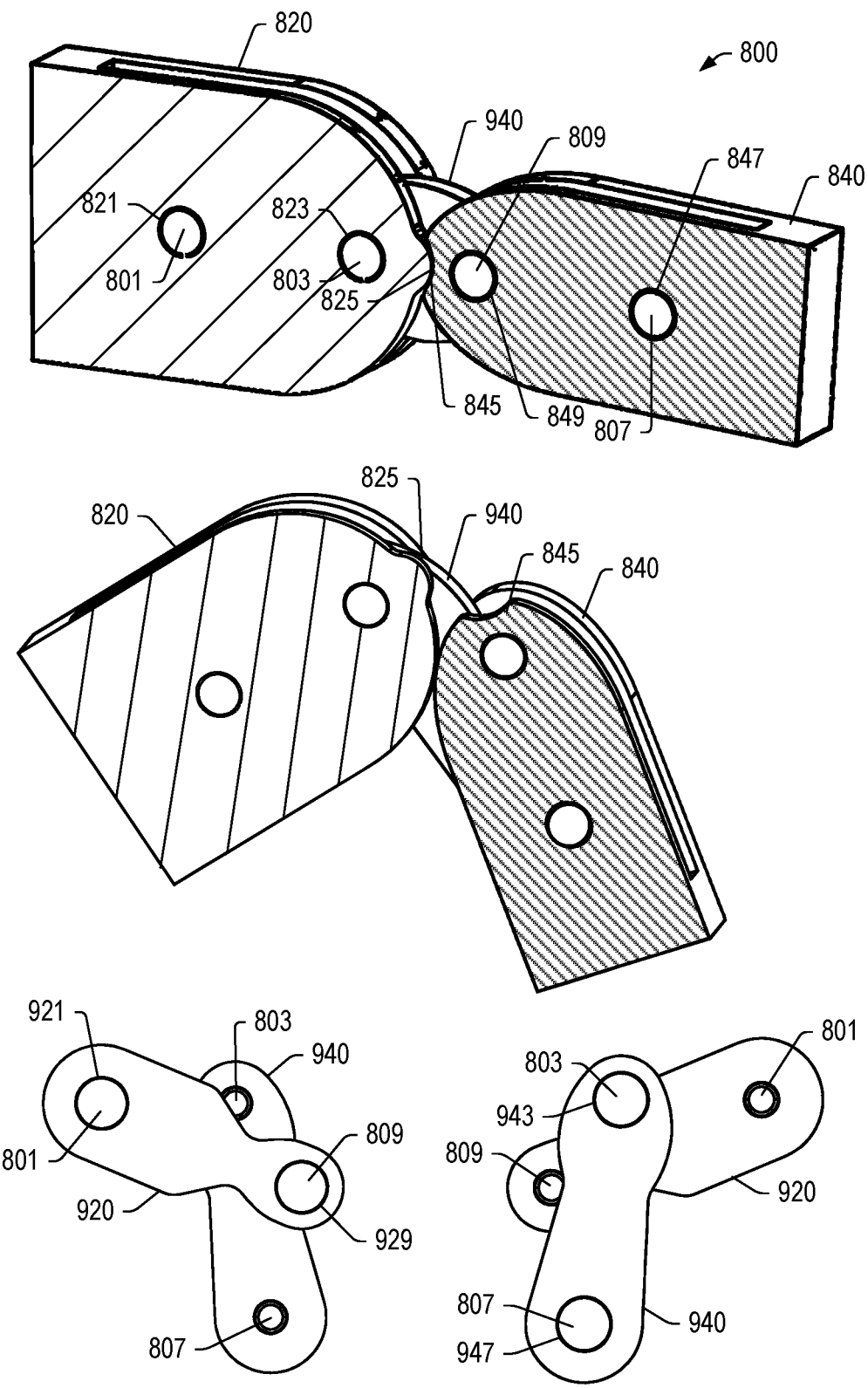
FIG. 9 is a series of cut-away views of an example of a hinge assembly and examples of opposing side views of bars.

FIG. 9 shows approximate cut-away views of the hinge assembly 800 of FIG. 8 where the housing 820 includes openings 821 and 823 that receive an axle 801 and the axle 803, respectively, and where the housing 840 includes openings 847 and 849 that receive the axles 807 and 809, respectively. FIG. 9 also shows opposing side views of the bars 920 and 940 along with the axles 801, 803, 807 and 809. As shown in the example of FIG. 9, the bars 920 and 940 may differ in shape. For example, the bars 920 and 940 may be shaped to provide for clearance of movement such that at least a 0 degree closed position and a 180 degree open position are attainable, noting that a 360 degree open position may be attainable (see, e.g., various features of the bars 320 and 340, which may be used to describe various features of the bars 920 and 940). As shown, the bar 920 can include openings 921 and 929 for axles 801 and 809, respectively, while the bar 940 can include openings 943 and 947 for axles 803 and 807, respectively.

As shown, the portion of the hinge assembly 800 of FIG. 9 includes the bar 940 while another portion (see, e.g., FIG. 8) includes the bar 920 (e.g., with appropriate axles and openings). In the cut-away views of FIG. 9, the housings 820 and 840 are in a 180 degree open position where the alignment features 825 and 845 are engaged and the housings 820 and 840 are in an approximately 90 degree open position where the alignment features 825 and 845 are not engaged. As to the opposing views of the bars 920 and 940, these correspond to the approximately 90 degree open position of the housings 820 and 840.

As an example, the axles 801 and 803 can be a first pair of axles that can be part of a first housing (e.g., the housing 820) where the first housing includes a portion of the hinge assembly 800 and the axles 807 and 809 can be a second pair of axles of a second housing (e.g., the housing 840) where the second housing includes a portion of the hinge assembly 800. In such an example, the hinge assembly 800 includes the bar 920 as a first bar supported by one of the first pair of axles (see, e.g., the axle 801) and one of the second pair of axles (see, e.g., the axle 809), the bar 940 as a second bar supported by another one of the first pair of axles (see, e.g., the axle 803) and another one of the second pair of axles (see, e.g., the axle 807), and an alignment mechanism for the first bar 920 and the second bar 940 (e.g., built into the housings 820 and 840), where the first bar 920 and the second bar 940 can overlap at an angle of 180 degrees of the first housing and the second housing and cross at angles other than 180 degrees of the first housing and the second housing (e.g., the housings 820 and 840).

Figure 10:
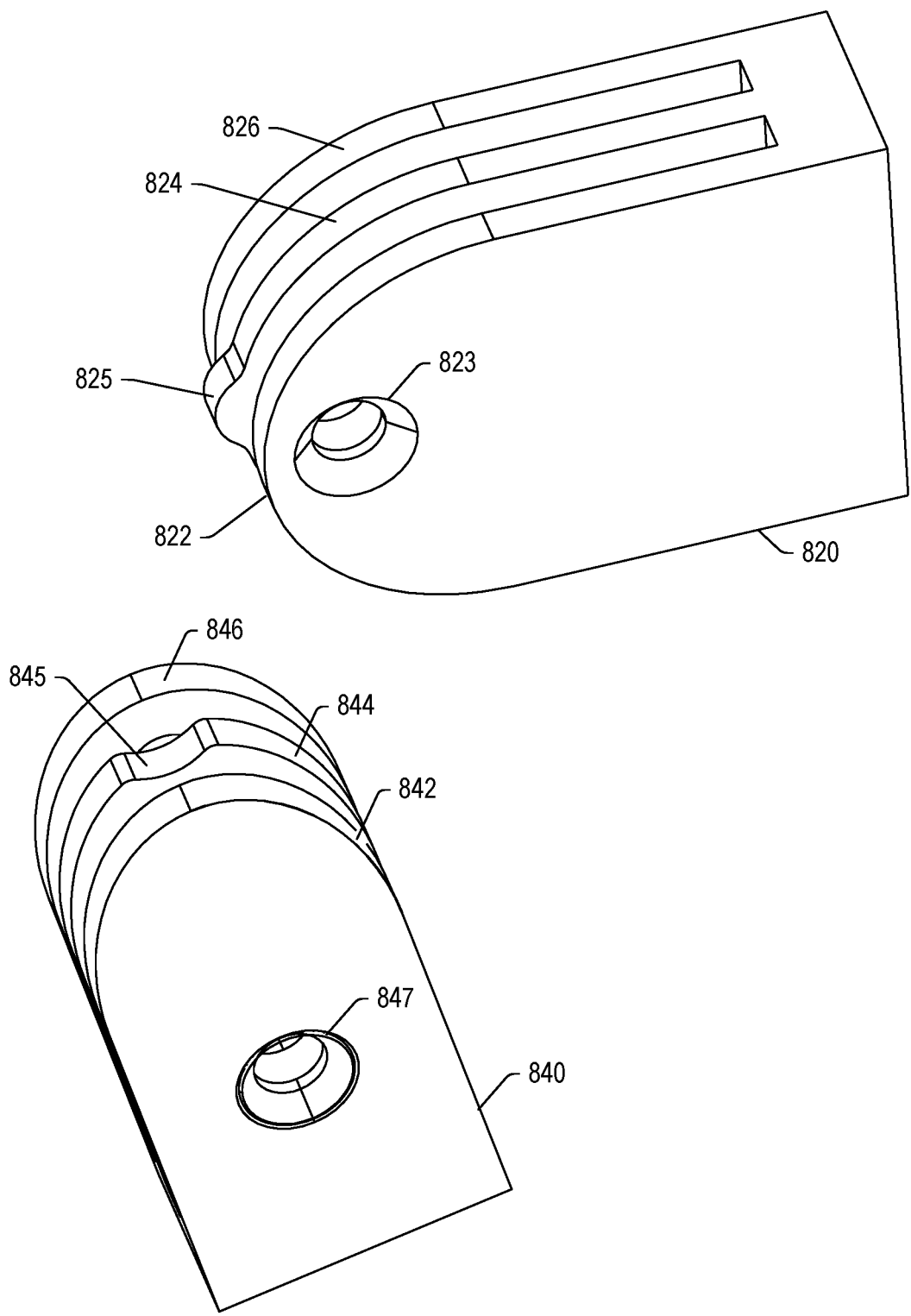
FIG. 10 is a series of perspective views of examples of portions of a hinge assembly.

FIG. 10 shows perspective views of portions of the hinge assembly 800. Specifically, the housing 820 and 840 are shown, with various respective features, including the alignment features 825 and 845 and the openings 823 and 847.

As an example, the alignment features 825 and 845 may be shaped to partially engage at an angle that is less than 180 degrees and to fully engage at an angle of 180 degrees. In such an approach, the alignment features 825 and 845 can provide stability to the hinge assembly 800 prior to reaching 180 degrees. Where the hinge assembly 800 provides for movement past 180 degrees, the alignment features 825 and 845 may partially engage to provide stability to the hinge assembly 800 after reaching 180 degrees. In such an example, upon transitioning a computing device from 0 degrees to 360 degrees, upon approach to 180 degrees, an alignment mechanism can at least partially engage to provide stability that hinders movement to an undesirable position (e.g., an undesirable orientation) of two housings of the computing device.

Figure 11:
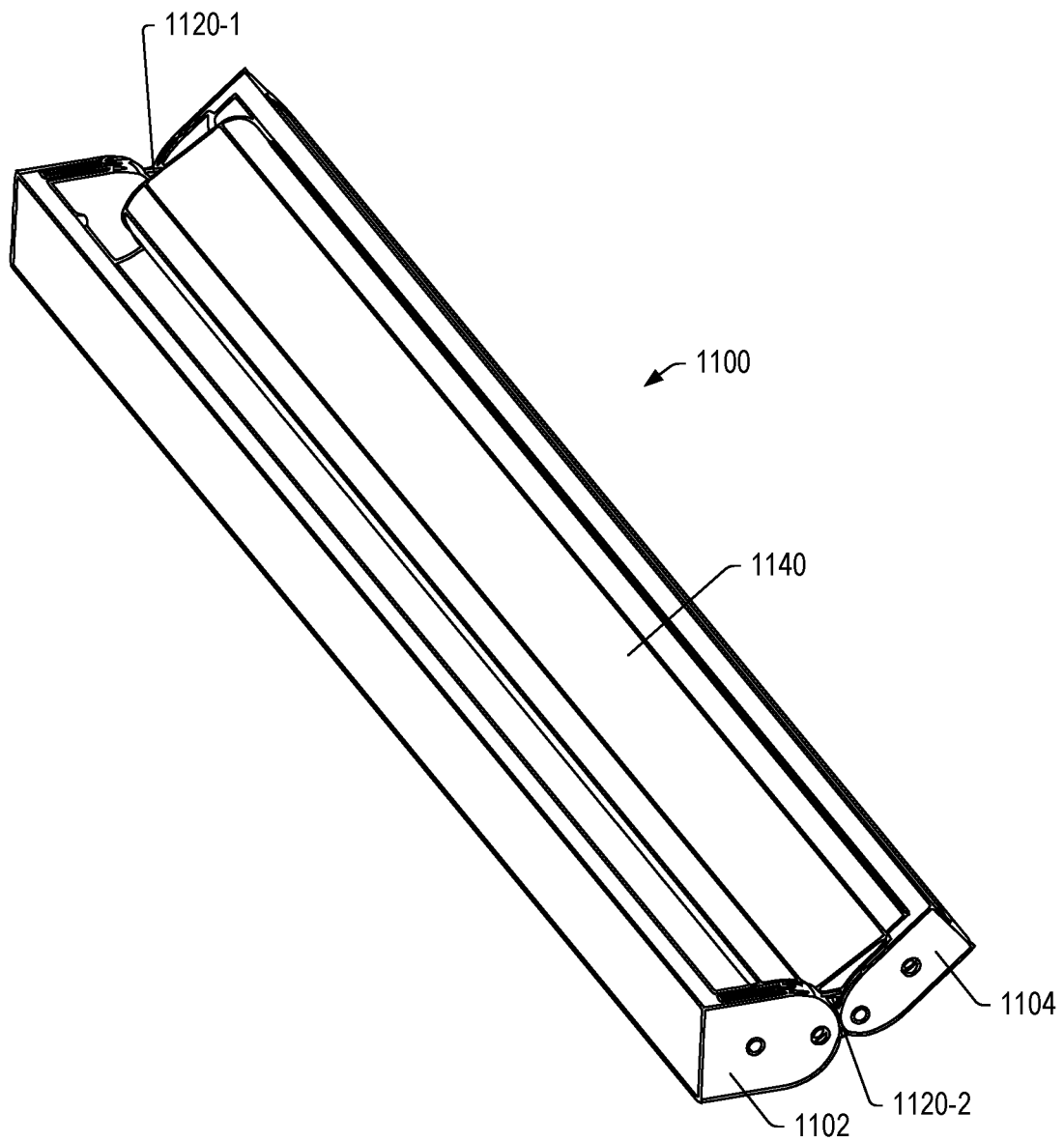
FIG. 11 is a perspective view of an angle of a hinge assembly.

FIG. 11 shows an example of a hinge assembly 1100 that includes two housings 1102 and 1104 with end bars 1120-1 and 1120-2 and a middle bar 1140. In such an example, the middle bar 1140 may include an interior chamber that can provide space for one or more components, which may be one or more components of a computing device. For example, consider circuitry, ear bud(s), speakers, etc.

As an example, a hinge assembly can include at least two bars. As an example, a computing device can include a number of hinge assemblies, for example, consider two hinge assemblies, which may be a left side and a right side hinge assembly (see, e.g., the hinge assemblies 132-1 and 132-2 of FIG. 1).

Figure 12:
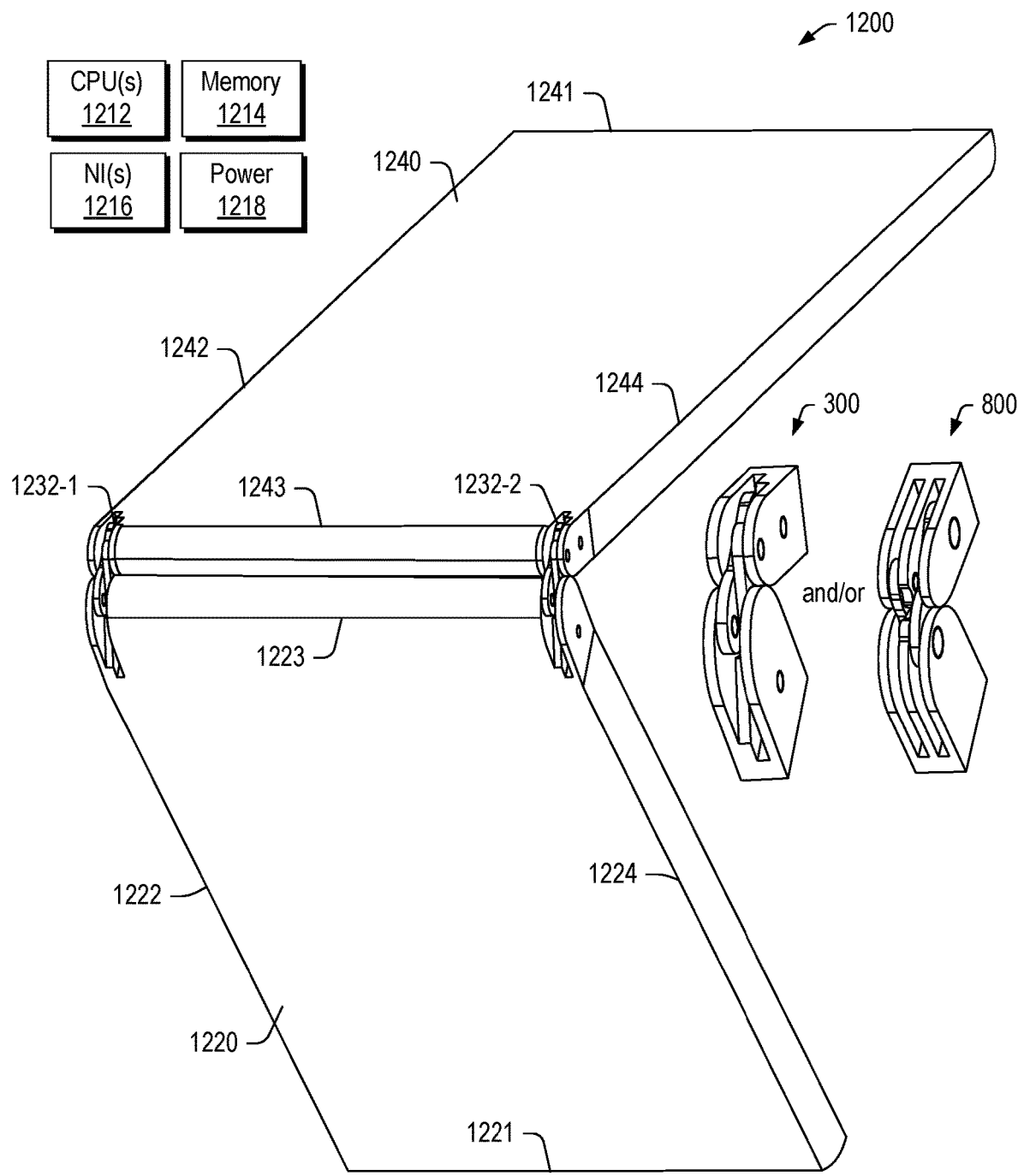
FIG. 12 is a perspective view of a computing device.

FIG. 12 shows an example of a computing device 1200 that can include a processor 1212; memory 1214 accessible by the processor 1212; a first housing 1220 that includes a first pair of axles; a second housing 1240 that includes a second pair of axles and a display operatively coupled to the processor 1212; and one or more hinge assemblies 1232-1 and 1232-2 that couples the first housing 1220 and the second housing 1240, where each of the one or more hinge assemblies 1232-1 and 1232-2 can include a first bar supported by one of the first pair of axles and one of the second pair of axles, a second bar supported by another one of the first pair of axles and another one of the second pair of axles, and an alignment mechanism for the first bar and the second bar, where the first bar and the second bar overlap at an angle of 180 degrees of the first housing and the second housing and cross at angles other than 180 degrees of the first housing and the second housing.

As shown in the example of FIG. 12, the one or more hinge assemblies 1232-1 and 1232-2 can include one or more instances of the hinge assembly 300 and/or one or more instances of the hinge assembly 800. In such an example, one or more of the housings 1220 and 1240 may include one or more integral features that can serve to accommodate bars, axles, etc. (e.g., one or more features of one or more of the housings 220, 240, 820 and 840). As an example, a hinge assembly may be a separate component that can be attached to a housing or housings (e.g., via an axle, an interference fit, glue, etc.). As an example, an axle may span a distance between two hinge assemblies where tightening of the axle causes a compressive force to attach the two hinge assemblies to a housing; noting that one axle may be used for one housing and another axle may be used for another housing (see, e.g., axles 301 and 307, axles 801 and 807, etc.).

In the example of FIG. 12, the housing 1220 can include a front end 1221, a back end 1223 and opposing sides 1222 and 1224 and the housing 1240 can include a front end 1241, a back end 1243 and opposing sides 1242 and 1244. As shown in the example of FIG. 12, the hinge assemblies 1232-1 and 1232-2 can be disposed at the sides 1222 and 1242 and the sides 1224 and 1244, respectively. As an example, these hinge assemblies 1232-1 and 1232-2 may be inset from the sides 1222 and 1242 and the sides 1224 and 1244, respectively.

As an example, one or more additional instances of a hinge assembly may be present and disposed between the sides 1222 and 1242 and the sides 1224 and 1244. For example, consider a central hinge assembly, or, for example, consider four hinge assemblies where one or more middle bars may be disposed between two adjacent hinge assemblies. In such an example, consider a left side middle bar and a right side middle bar where the middle bars may include one or more components. For example, consider one or more speakers such as a left speaker and a right speaker. As an example, a computing device may include one or more instances of the hinge assembly 1100 of FIG. 11.

As an example, the hinge assemblies 1232-1 and 1232-2 may be inset and, for example, covered. Where one or more covers are utilized, a computing device may have a relatively clean and ergonomic outer surface, for example, two housings coupled by what may appear to be "hidden" hinge assemblies may provide such an outer surface; noting that bars may be visible as coupling the two housings (e.g., in a small gap between the two housings). As an example, the housings 1220 and 1240 may be operatively coupled using wireless circuitry and/or wired circuitry. As an example, a hinge assembly may include one or more conductive components (e.g., made at least in part of a metallic conductive material, etc.) that can transmit data and/or power that can be electrically coupled to circuitry. For example, in examples of FIG. 7, FIG. 8 and/or FIG. 9, portions of the housings 220 and 240 and/or 820 and 840 may contact for transmission, one or more of the bars 320 and 340 and/or 920 and 940 may provide for transmission, etc. As an example, a bar may be conductive and/or include one or more conductors that may be in contact with an axle where, for example, a housing may be an electrical insulator (e.g., an insulating polymeric material, etc.). For example, consider FIG. 8 where the bars 920 and 940 may be conductive and/or include one or more conductors and where the housings 820 and 840 may be electrical insulators. In such an example, one or more of the axles 801, 803, 807 and 809 may be conductive and electrically couple to circuitry. As an example, a flexible wire or flexible wires may be provided at a hinge assembly and/or at another position to provide for operatively coupling circuitry of housings.

In the example of FIG. 12, the housings 1220 and 1240 may be housings of a clamshell computing device which may be defined in part by a size such as a display size. For example, consider a 10 inch, 12 inch, 13 inch, 14 inch, 15 inch, 16 inch, 17 inch, etc., clamshell computing device. As an example, a 14 inch clamshell computing device may have thickness, width and depth dimensions of 15.68 mm to 17.7 mm×320.4 mm×214.6 mm (e.g., 0.62 inch to 0.7 inch×12.61 inch×8.45 inch).

As an example, use of the example hinge assemblies 300 and/or 800 may provide for a reduction in mass compared to one or more other types of hinge assemblies. As an example, use of the example hinge assemblies 300 and/or 800 may provide for a reduction in manufacturing processes and/or equipment (e.g., tools, etc.).

As explained, an alignment mechanism can provide for alignment control of multiple bars such that the bars overlap at an angle of 180 degrees and cross at other angles. As explained, alignment features can include a dynamic moving pin and/r a static prong and a static socket. Where a back end of a housing is to have a cleaner appearance, an internal dynamic pin may be utilized as a prong and a socket may detract from smoothness of housing back ends. A cleaner approach may be cleaner visually and ergonomically as an exposed prong may contact a user's hand. As explained, a prong may be a type of tooth that extends outwardly from a hinge assembly at a back end of a computing device. As an example, a hinge assembly may include a dynamic prong that is associated with a cam such that the prong dynamically extends outwardly upon approaching an angle of 180 degrees between two housings.

As an example, a hinge assembly may include various components that can be fabricated from flat stock material where, for example, a desired amount of friction may be added by compressing a stack of components with one or more bolts and/or springs (e.g., consider one or more conical springs or spring washers). A desirable amount of friction may provide for holding a housing at an angle with respect to another housing when subjected to gravity such that, for example, a display housing does not creep and lose its angle with respect to a base housing.

As an example, a computing device can include a processor; memory accessible by the processor; a first housing that includes a first pair of axles; a second housing that includes a second pair of axles and a display operatively coupled to the processor; and a hinge assembly that couples the first housing and the second housing, where the hinge assembly includes a first bar supported by one of the first pair of axles and one of the second pair of axles, a second bar supported by another one of the first pair of axles and another one of the second pair of axles, and an alignment mechanism for the first bar and the second bar, where the first bar and the second bar overlap at an angle of 180 degrees of the first housing and the second housing and cross at angles other than 180 degrees of the first housing and the second housing. In such an example, at an angle of 0 degrees, the first housing and the second housing can be in a closed position.

As an example, an alignment mechanism can include a slidable pin that contacts a first bar and a second bar. In such an example, the slidable pin can include a body portion and a head portion. For example, consider a first bar that includes a slot that receives the head portion of the pin and a second bar that includes a slot that receives the body portion of the pin.

As an example, an alignment mechanism can include a prong and a socket. In such an example, at an angle of 180 degrees of two housings, the prong can be received by the socket.

As an example, an alignment mechanism can prevent a first bar and a second bar from uncrossing at angles other than 180 degrees.

As an example, a computing device can include a first hinge assembly and a second hinge assembly where, for example, the first hinge assembly and the second hinge assembly spaced toward opposing sides of a first housing and a second housing. As an example, a computing device may include more than two hinge assemblies.

As an example, a first housing can have a first thickness and a second housing can have a second thickness, where the first thickness is greater than the second thickness. For example, consider the example of FIG. 12 where the housing 1220 can be thicker than the housing 1240. As an example, housings may be of equal thickness or of differing thicknesses.

As an example, a first bar can have a first shape and a second bar can have a second shape, where the first shape and the second shape differ. For example, FIG. 3 shows two bars 320 and 340 with different shapes and FIG. 9 shows two bars 920 and 940 with different shapes.

As an example, a bar or bars can be formed from plate stock material. For example, consider a stamping, punching, cutting, etc., process that can form bars from plate stock material, optionally with openings for axles.

As an example, a method can include, in a computing device that includes a first housing that includes a first pair of axles, a second housing that includes a second pair of axles, and a hinge assembly that couples the first housing and the second housing, where the hinge assembly includes a first bar supported by one of the first pair of axles and one of the second pair of axles, a second bar supported by another one of the first pair of axles and another one of the second pair of axles, and an alignment mechanism for the first bar and the second bar, preventing, via the alignment mechanism, uncrossing of the first bar and the second bar. In such an example, preventing can include sliding a pin disposed in part in a first slot of the first bar and disposed in part in a second slot of the second bar where, for example, the first slot may be disposed between the first pair of axles and the second slot may be disposed between the second pair of axles. As an example, preventing can include engaging a prong in a socket. In such an example, the prong can partially engages the socket at an angle less than 180 degrees of the first housing and the second housing and, for example, the prong, the first pair of axles and the second pair of axles may align at an angle of 180 degrees of the first housing and the second housing.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 13:
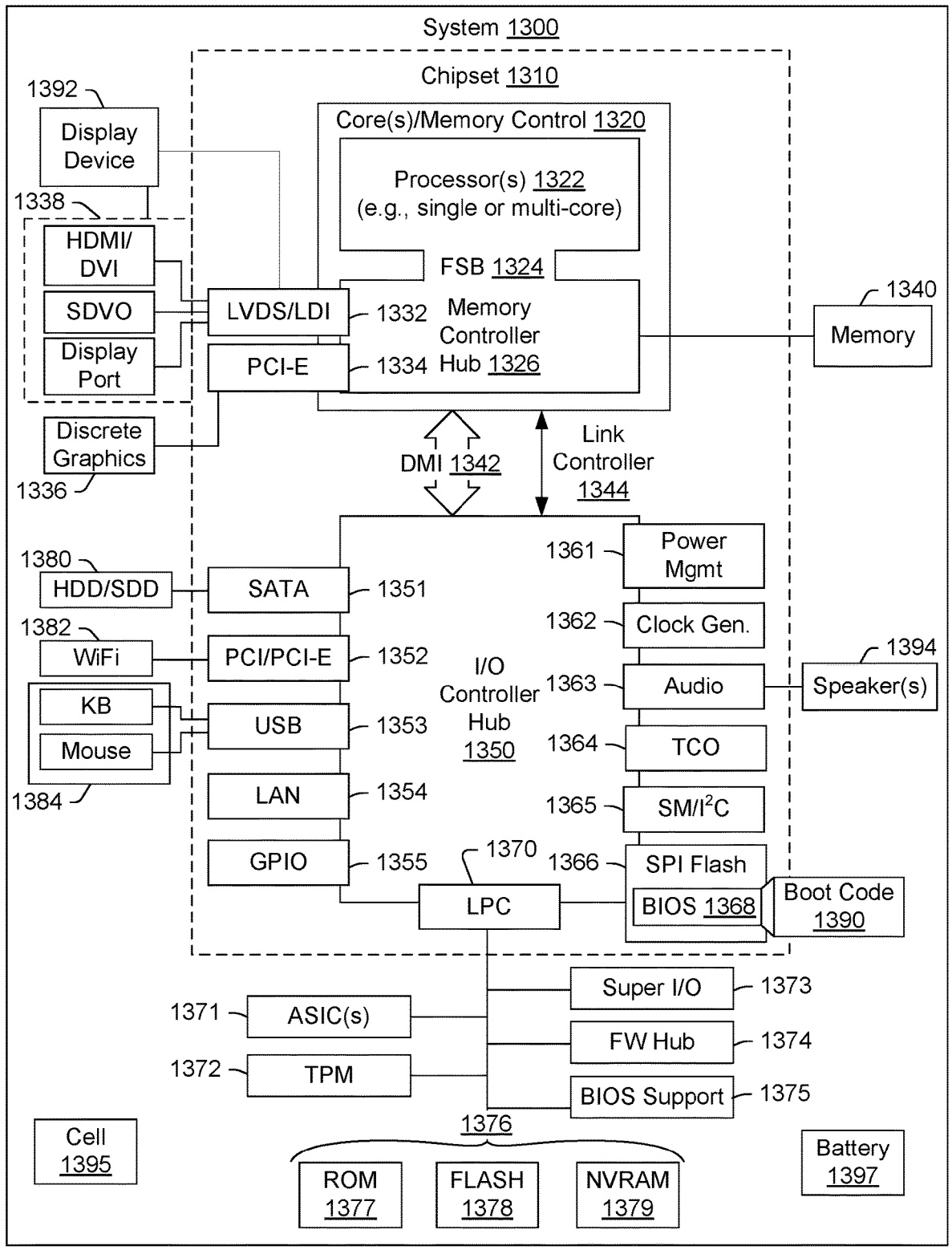
FIG. 13 is a diagram of an example of a system.

While various examples of circuits or circuitry have been discussed, FIG. 13 depicts a block diagram of an illustrative computer system 1300. The system 1300 may be a desktop computer system, such as one of the THINKCENTRE® or THINKPAD® series of personal computers sold by Lenovo (US) Inc. of Morrisville, NC, or a workstation computer, such as the THINKSTATION®, which are sold by Lenovo (US) Inc. of Morrisville, NC; however, as apparent from the description herein, a display device or other machine may include other features or only some of the features of the system 1300.

As shown in FIG. 13, the system 1300 includes a so-called chipset 1310. A chipset refers to a group of integrated circuits, or chips, that are designed to work together. Chipsets are usually marketed as a single product (e.g., consider chipsets marketed under the brands INTEL®, AMD®, etc.).

In the example of FIG. 13, the chipset 1310 has a particular architecture, which may vary to some extent depending on brand or manufacturer. The architecture of the chipset 1310 includes a core and memory control group 1320 and an I/O controller hub 1350 that exchange information (e.g., data, signals, commands, etc.) via, for example, a direct management interface or direct media interface (DMI) 1342 or a link controller 1344. In the example of FIG. 13, the DMI 1342 is a chip-to-chip interface (sometimes referred to as being a link between a "northbridge" and a "southbridge").

The core and memory control group 1320 include one or more processors 1322 (e.g., single core or multi-core) and a memory controller hub 1326 that exchange information via a front side bus (FSB) 1324. As described herein, various components of the core and memory control group 1320 may be integrated onto a single processor die, for example, to make a chip that supplants the conventional "northbridge" style architecture.

The memory controller hub 1326 interfaces with memory 1340. For example, the memory controller hub 1326 may provide support for DDR SDRAM memory (e.g., DDR, DDR2, DDR3, etc.). In general, the memory 1340 is a type of random-access memory (RAM). It is often referred to as "system memory".

The memory controller hub 1326 further includes a low-voltage differential signaling interface (LVDS) 1332. The LVDS 1332 may be a so-called LVDS Display Interface (LDI) for support of a display device 1392 (e.g., a CRT, a flat panel, a projector, etc.). A block 1338 includes some examples of technologies that may be supported via the LVDS interface 1332 (e.g., serial digital video, HDMI/DVI, display port). The memory controller hub 1326 also includes one or more PCI-express interfaces (PCI-E) 1334, for example, for support of discrete graphics 1336. Discrete graphics using a PCI-E interface has become an alternative approach to an accelerated graphics port (AGP). For example, the memory controller hub 1326 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1350 includes a variety of interfaces. The example of FIG. 13 includes a SATA interface 1351, one or more PCI-E interfaces 1352 (optionally one or more legacy PCI interfaces), one or more USB interfaces 1353, a LAN interface 1354 (more generally a network interface), a general purpose I/O interface (GPIO) 1355, a low-pin count (LPC) interface 1370, a power management interface 1361, a clock generator interface 1362, an audio interface 1363 (e.g., for speakers 1394), a total cost of operation (TCO) interface 1364, a system management bus interface (e.g., a multi-master serial computer bus interface) 1365, and a serial peripheral flash memory/controller interface (SPI Flash) 1366, which, in the example of FIG. 13, includes BIOS 1368 and boot code 1390. With respect to network connections, the I/O hub controller 1350 may include integrated gigabit Ethernet controller lines multiplexed with a PCI-E interface port. Other network features may operate independent of a PCI-E interface.

The interfaces of the I/O hub controller 1350 provide for communication with various devices, networks, etc. For example, the SATA interface 1351 provides for reading, writing or reading and writing information on one or more drives 1380 such as HDDs, SDDs or a combination thereof. The I/O hub controller 1350 may also include an advanced host controller interface (AHCI) to support one or more drives 1380. The PCI-E interface 1352 allows for wireless connections 1382 to devices, networks, etc. The USB interface 1353 provides for input devices 1384 such as keyboards (KB), one or more optical sensors, mice and various other devices (e.g., microphones, cameras, phones, storage, media players, etc.). On or more other types of sensors may optionally rely on the USB interface 1353 or another interface (e.g., I²C, etc.). As to microphones, the system 1300 of FIG. 13 may include hardware (e.g., audio card) appropriately configured for receipt of sound (e.g., user voice, ambient sound, etc.).

In the example of FIG. 13, the LPC interface 1370 provides for use of one or more ASICs 1371, a trusted platform module (TPM) 1372, a super I/O 1373, a firmware hub 1374, BIOS support 1375 as well as various types of memory 1376 such as ROM 1377, Flash 1378, and non-volatile RAM (NVRAM) 1379. With respect to the TPM 1372, this module may be in the form of a chip that can be used to authenticate software and hardware devices. For example, a TPM may be capable of performing platform authentication and may be used to verify that a system seeking access is the expected system.

The system 1300, upon power on, may be configured to execute boot code 1390 for the BIOS 1368, as stored within the SPI Flash 1366, and thereafter processes data under the control of one or more operating systems and application software (e.g., stored in system memory 1340). An operating system may be stored in any of a variety of locations and accessed, for example, according to instructions of the BIOS 1368. Again, as described herein, a satellite, a base, a server or other machine may include fewer or more features than shown in the system 1300 of FIG. 13. Further, the system 1300 of FIG. 13 is shown as optionally include cell phone circuitry 1395, which may include GSM, CDMA, etc., types of circuitry configured for coordinated operation with one or more of the other features of the system 1300.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing device comprising:
   a processor;
   memory accessible by the processor;
   a first housing that comprises a first pair of axles;
   a second housing that comprises a second pair of axles and a display operatively coupled to the processor; and
   a hinge assembly that couples the first housing and the second housing, wherein the hinge assembly comprises a first bar supported by one of the first pair of axles and one of the second pair of axles, a second bar supported by another one of the first pair of axles and another one of the second pair of axles, and an alignment mechanism for the first bar and the second bar, wherein the first bar and the second bar overlap at an angle of 180 degrees of the first housing and the second housing and cross at angles other than 180 degrees of the first housing and the second housing,
   wherein the alignment mechanism comprises a slidable pin that contacts the first bar and the second bar, wherein the slidable pin comprises a body portion and a head portion, wherein the first bar comprises a slot that receives the head portion of the pin and wherein the second bar comprises a slot that receives the body portion of the pin.

2. The computing device of claim 1, wherein, at an angle of 0 degrees, the first housing and the second housing are in a closed position.

3. The computing device of claim 1, wherein the alignment mechanism prevents the first bar and the second bar from uncrossing at angles other than 180 degrees.

4. The computing device of claim 1, wherein the hinge assembly comprises a first hinge assembly and further comprising a second hinge assembly.

5. The computing device of claim 4, wherein the first hinge assembly and the second hinge assembly are spaced toward opposing sides of the first housing and the second housing.

6. The computing device of claim 1, wherein the first housing comprises a first thickness and the second housing comprises a second thickness, wherein the first thickness is greater than the second thickness.

7. The computing device of claim 1, wherein the first bar has a first shape and the second bar has a second shape, wherein the first shape and the second shape differ.

8. The computing device of claim 1, wherein the first bar is formed from plate stock material.

9. The computing device of claim 8, wherein the second bar is formed from the plate stock material.

10. A method comprising:
    in a computing device that comprises a first housing that comprises a first pair of axles, a second housing that comprises a second pair of axles, and a hinge assembly that couples the first housing and the second housing, wherein the hinge assembly comprises a first bar supported by one of the first pair of axles and one of the second pair of axles, a second bar supported by another one of the first pair of axles and another one of the second pair of axles, and an alignment mechanism for the first bar and the second bar, preventing, via the alignment mechanism, uncrossing of the first bar and the second bar, wherein the preventing comprises sliding a pin disposed in part in a first slot of the first bar and disposed in part in a second slot of the second bar, wherein the first slot is disposed between the first pair of axles and wherein the second slot is disposed between the second pair of axles.

11. A computing device comprising:
    a processor;
    memory accessible by the processor;
    a first housing that comprises side plates and an intermediate plate disposed between the side plates, and a first pair of axles that comprise an axle that extends between one of the side plates and the intermediate plate and another axle that extends between another one of the side plates and the intermediate plate;
    a second housing that comprises a display operatively coupled to the processor, side plates and an intermediate plate disposed between the side plates, and a second pair of axles that comprise an axle that extends between one of the side plates and the intermediate plate and another axle that extends between another one of the side plates and the intermediate plate; and
    a hinge assembly that couples the first housing and the second housing, wherein the hinge assembly comprises a first bar supported by one of the first pair of axles and one of the second pair of axles, a second bar supported by another one of the first pair of axles and another one of the second pair of axles, and an alignment mechanism for the first bar and the second bar, wherein the alignment mechanism is formed by one of the plates of the first housing having a prong or a socket and one of the plates of the second housing having a corresponding socket or a corresponding prong, wherein the first bar and the second bar overlap at an angle of 180 degrees of the first housing and the second housing and cross at angles other than 180 degrees of the first housing and the second housing, and wherein, at the angle of 180 degrees, the alignment mechanism is engaged by the prong being received by the socket.

12. The computing device of claim 11, wherein the prong, the first pair of axles and the second pair of axles align at an angle of 180 degrees of the first housing and the second housing.

* * * * *